US012663136B2

(12) United States Patent
　　Drüppel et al.

(10) Patent No.: US 12,663,136 B2
(45) Date of Patent: Jun. 23, 2026

(54) COMPONENT FOR A MOTOR VEHICLE LIGHTING DEVICE, CONNECTION ARRANGEMENT, AND METHOD FOR RELEASING A CONNECTION ARRANGEMENT

(71) Applicant: HELLA GMBH & CO. KGAA, Lippstadt (DE)

(72) Inventors: Mathias Drüppel, Lippstadt (DE); Odo Karger, Geseke (DE); Mathias Niedling, Erfurt (DE); Heinz Pollmann, Geseke (DE); Simone Rohrberg, Lippstadt (DE); Christian Spork, Lippstadt (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 0 days.

(21) Appl. No.: 19/069,715

(22) Filed: Mar. 4, 2025

(65) Prior Publication Data

US 2025/0297718 A1　　Sep. 25, 2025

(30) Foreign Application Priority Data

Mar. 19, 2024　　(DE) .......................... 102024107769.7

(51) Int. Cl.
　　*F21S 41/29*　　　　(2018.01)
　　*B60Q 1/04*　　　　(2006.01)

(52) U.S. Cl.
　　CPC ................ *F21S 41/29* (2018.01); *B60Q 1/04* (2013.01)

(58) Field of Classification Search
　　CPC ........... F21S 41/29; F21S 41/295; B60Q 1/04
　　See application file for complete search history.

(56) References Cited

U.S. PATENT DOCUMENTS 5,424,874 A * 6/1995 Ishikawa ................. F21S 41/29
　　　　　　　　　　　　　　　　　　　362/546

FOREIGN PATENT DOCUMENTS

| | | | |
|---|---|---|---|
| DE | 10105641 A1 * | 8/2002 | .......... B60C 23/061 |
| DE | 102008020880 A1 | 10/2009 | |
| GB | 2230983 A * | 11/1990 | .......... B24B 13/005 |
| JP | H11219604 A * | 8/1999 | .............. F21S 41/29 |

* cited by examiner

*Primary Examiner* — Robert J May

(74) *Attorney, Agent, or Firm* — WARNER NORCROSS + JUDD LLP

(57)　　ABSTRACT

The present invention relates to a component for a motor vehicle lighting device, comprising a joining portion with an adhesive channel for forming an adhesive connection with a joining crosspiece of a second component. According to the invention, the joining portion has a solvent channel connected to the adhesive channel.

10 Claims, 2 Drawing Sheets

COMPONENT FOR A MOTOR VEHICLE LIGHTING DEVICE, CONNECTION ARRANGEMENT, AND METHOD FOR RELEASING A CONNECTION ARRANGEMENT

CROSS-REFERENCE TO RELATED APPLICATIONS

The present application claims the benefit of German Patent Application No. 10-2024-107-769.7, filed Mar. 19, 2024, the disclosure of which is incorporated by reference.

FIELD OF THE INVENTION

The present invention relates to a component for a motor vehicle lighting device. The component includes a joining portion with an adhesive channel for forming an adhesive connection with a joining crosspiece of a second component. The present invention also includes an associated connection arrangement, in particular with a housing and a cover lens of a motor vehicle lighting device, and a method for releasing such a connection arrangement.

BACKGROUND OF THE INVENTION

Motor vehicle lighting devices such as headlights or rear lights have a housing that is closed on the light emission side with a transparent or translucent cover lens. The connection arrangement is usually formed with an adhesive connection, wherein the housing or the cover plate has a joining portion with an adhesive-filled adhesive channel, and the respective joining partner has a corresponding joining crosspiece which projects into the adhesive channel and the adhesive contained therein. The adhesive channel and the joining crosspiece are optionally completely circumferential, so that the inside of the housing is sealed against the operating environment by the adhesive connection and the cover lens.

The disadvantage of this type of connection arrangement is that subsequently it no longer can be released, so that it is not possible to open the front of the motor vehicle lighting device, for example for maintenance or repair purposes, by removing the cover lens, without causing damage.

SUMMARY OF THE INVENTION

The object of the present invention is to propose an alternative embodiment of a component according to the prior art for a motor vehicle lighting device and a connection arrangement based thereon, which is characterized by a practical disconnectability. This object is achieved by a component, an associated connection arrangement, and a method for releasing such a connection arrangement. Advantageous further embodiments of the invention are given below.

The technical teaching of the invention discloses a component for a motor vehicle lighting device, comprising a joining portion with an adhesive channel for forming an adhesive connection with a joining crosspiece of a second component, wherein the joining portion has a solvent channel connected to the adhesive channel according to the invention.

The invention is based on the idea of using the solvent channel to create a structure via which a solvent can be injected into the adhesive channel, wherein the solvent is suitable for softening the adhesive located in the adhesive channel so that the adhesive connection can be subsequently released if necessary. The solvent channel is arranged on the adhesive channel in such a manner that it is accessible from the outside in an associated connection arrangement. Optionally, the solvent channel is connected only to the adhesive channel and is otherwise insulated from the operating environment in a light- and media-tight manner, so that appropriate access points for injecting the solvent are only introduced when needed.

Advantageously, the solvent channel extends substantially along the entire length of the adhesive channel. This provides a large contact surface for the solvent injected into the solvent channel, so that rapid and full-surface softening of the adhesive is supported. In particular, the solvent channel is substantially connected to the adhesive channel along its entire length.

A further advantage is that the solvent channel has such a small channel width that it cannot be penetrated by an adhesive intended for creating the adhesive connection. The channel width must therefore be adapted to the viscosity of the intended adhesive in the unsolidified state, and selected to be so small that the adhesive applied to the adhesive channel when the adhesive connection is created does not, or at least does not to a significant extent, flow into the solvent channel, so that it remains free for the subsequent injection of solvent. For example, the solvent channel can be slot-shaped with a channel width of approx. 0.5 mm to 2 mm and a channel depth of 3 mm to 50 mm.

In an advantageous embodiment, the joining portion has at least one access portion which is provided for opening an external access port to the solvent channel, in particular by means of a bore, wherein the access portion has a structure which locally stiffens the solvent channel. The external access port to the solvent channel is optionally only opened when required, and the access portion ensures sufficient mechanical stability, for example, to drive a bore into the solvent channel without damaging further areas of the joining portion. Optionally, the joining portion has a plurality of regularly spaced access portions so that a corresponding plurality of external access ports to the solvent channel can be opened.

In particular, the component according to the invention is designed as a housing for a motor vehicle lighting device, and the second component as the associated joining partner with the corresponding joining crosspiece is formed by a cover lens. Alternatively, the component according to the invention is designed as the cover lens and the second component is designed as the housing.

The invention also relates to a connection arrangement comprising a first component according to any of the aforementioned embodiments and a second component, wherein an adhesive connection is formed between the joining portion of the first component and a joining crosspiece of the second component, wherein the joining crosspiece projects into the adhesive channel filled with an adhesive, and wherein the solvent channel is free of adhesive. Particularly, the connection arrangement is formed with a housing and a cover lens of a motor vehicle lighting device.

Furthermore, the invention relates to a method for releasing such a connection arrangement, wherein the method comprises at least the following steps:

providing the connection arrangement, opening at least one external access port to the solvent channel, in particular by drilling into the at least one access portion, injecting a solvent into the solvent channel via the at least one external access port, waiting for the adhesive to soften by reacting with the solvent, and releasing the first component and the second component from one another.

Therein, a solvent that has sufficient fluidity to wet the solvent channel and reach the adhesive channel through it must be used. The solvent causes the solidified adhesive to soften, however, it is advisable that the solvent does not attack the materials used for the components.

After releasing the connection arrangement of housing and cover lens, the interior of the housing is externally accessible for maintenance or repair work on a component of the motor vehicle lighting device contained in it. Following such a measure, the adhesive channel can be cleaned, filled with fresh adhesive and the cover plate reconnected to the housing.

BRIEF DESCRIPTION OF THE DRAWINGS

The invention is illustrated below by means of an embodiment example with reference to the figures and the associated description. In the figures.

DETAILED DESCRIPTION OF THE CURRENT EMBODIMENT

Figure 1B:
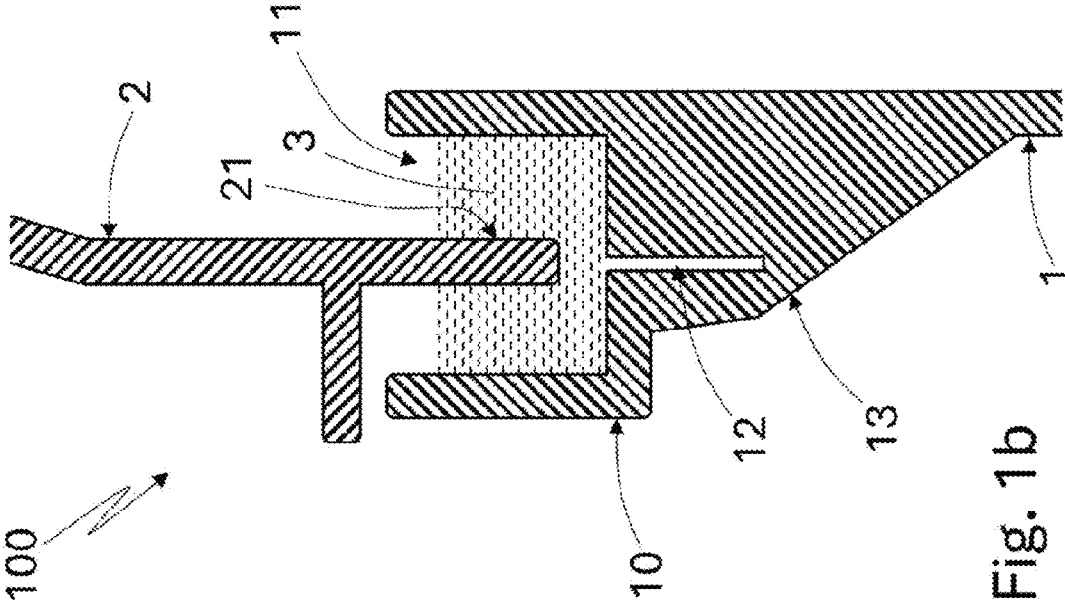
FIGS. 1a-1b are sectional views of an exemplary embodiment of the connection arrangement according to the invention.
Figure 1A:
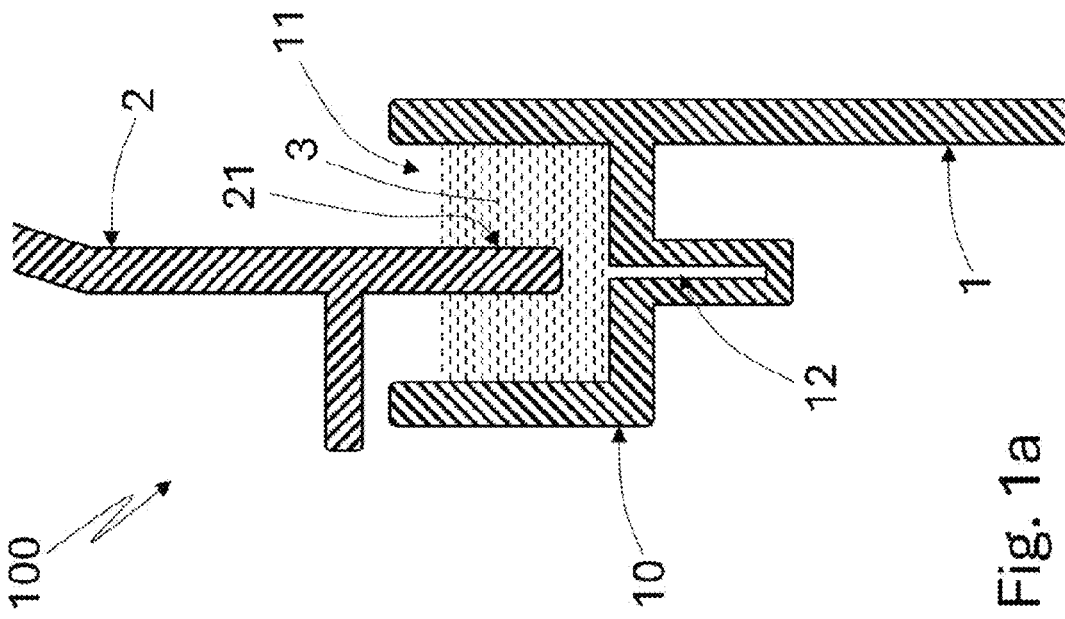

FIG. 1a and FIG. 1b show sectional views of an embodiment of the connection arrangement 100 according to the invention, which comprises a first component 1 in the form of a housing of a motor vehicle lighting device, and a second component 2 in the form of a cover lens. The inside of the housing is on the right-hand side of the image, the external operating environment is on the left-hand side, and the light emission side of the motor vehicle lighting device is on the upper edge of the image.

The first component 1 comprises the joining portion 10 with the adhesive channel 11, which is filled with the adhesive 3, whereby the joining crosspiece 21 of the second component 2 projects into the adhesive channel 11 and the adhesive 3, so that an adhesive connection is formed. The joining portion 10 according to the invention also has the solvent channel 12, which is connected to the adhesive channel 11, wherein the solvent channel 12 is free of adhesive 3. The joining portion 10 with the adhesive channel 11 and the solvent channel 12 preferably extends along the entire circumference of the first component 1, so that it is completely sealed on the front side by the adhesive connection and the second component 2. Therein, the solvent channel 12 is connected to the adhesive channel 11 along its entire length in the manner shown in FIG. 1a and FIG. 1b.

FIG. 1b shows a section through an access portion 13, which is provided for opening an external access port to the solvent channel 12, in particular by means of a bore, wherein the access portion 13 has a rib-like structure which locally stiffens the solvent channel 12.

Figures 2A, 2B, 2C:
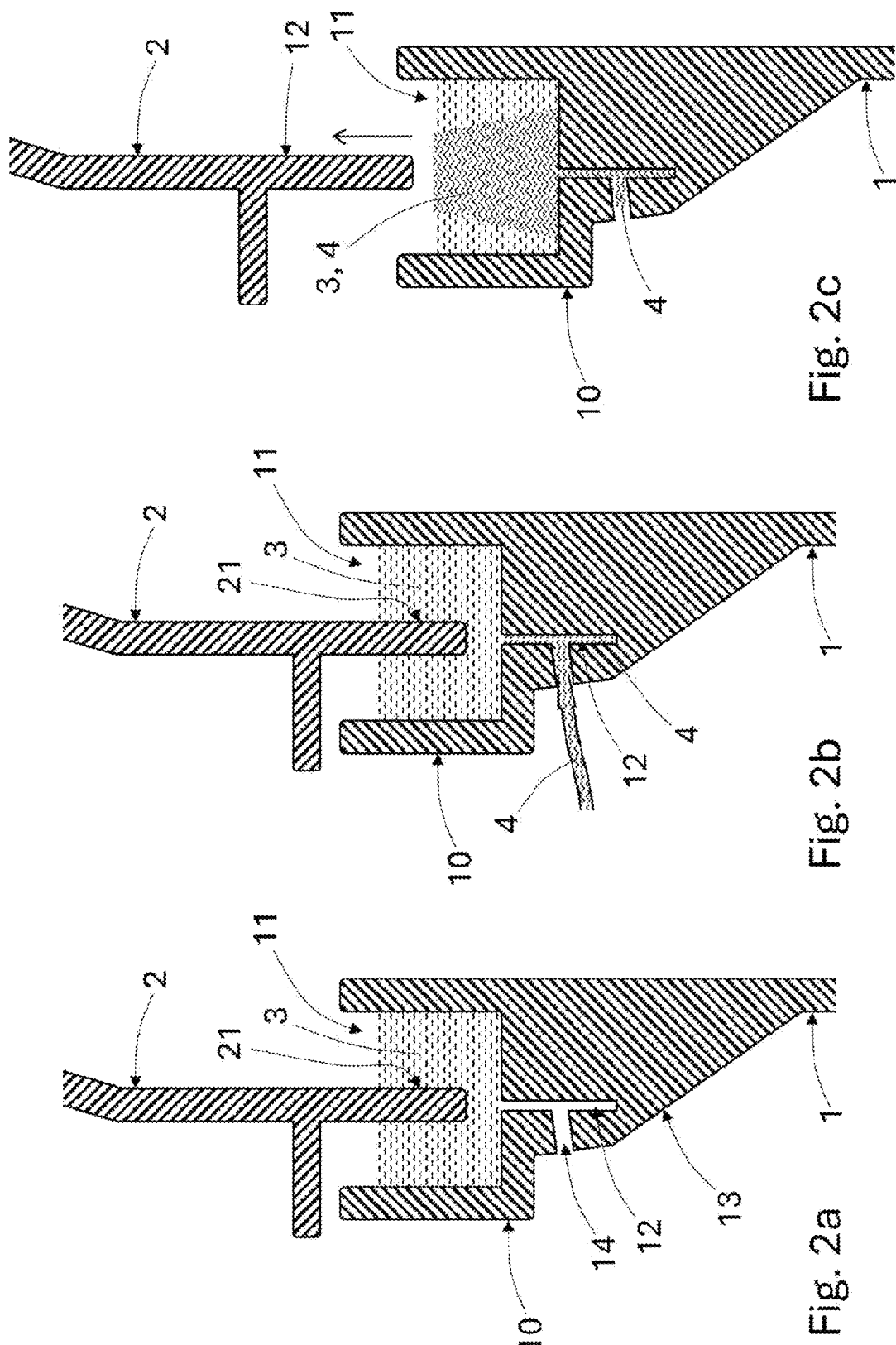
FIGS. 2a-2c illustrate the method for releasing the connection arrangement according to the invention.

FIG. 2a, FIG. 2b and FIG. 2c illustrate method steps of the method according to the invention for releasing a connection arrangement according to the exemplary embodiment.

FIG. 2a shows the connection arrangement with an opened external access port 14 to the solvent channel 12, for which purpose a corresponding bore has been introduced in the access portion 13. Particularly, several such access portions 13 are arranged along the circumference of the joining portion 10, and a corresponding plurality of external access ports 14 are opened.

FIG. 2b shows the injecting of the solvent 4 via the external access port 14 into the solvent channel 12, for which purpose the solvent 4 has a suitably high fluidity. The solvent 4 reaches the connected adhesive channel 11 via the solvent channel 12 and thus reacts with the adhesive 3 arranged therein.

FIG. 2c shows the situation after waiting for the adhesive 3 to soften by reacting with the solvent 4 that has penetrated into the adhesive channel 11, and the first component 1 and the second component 2 are released from one another. The softened adhesive 3 no longer has any significant adhesive effect on the joining crosspiece 21, so that the second component 2 can be lifted upwards from the first component 1 as shown.

LIST OF REFERENCE NUMERALS 1 (first) component
10 joining portion
11 adhesive channel
12 solvent channel
13 access portion
14 external access port
2 second component
21 joining crosspiece
3 adhesive
4 solvent
100 connection arrangement The above description is that of current embodiment of the invention. Various alterations and changes can be made without departing from the spirit and broader aspects of the invention. This disclosure is presented for illustrative purposes and should not be interpreted as an exhaustive description of all embodiments of the invention or to limit the scope of the claims to the specific elements illustrated or described in connection with these embodiments. Any reference to elements in the singular, for example, using the articles "a," "an," "the," or "said," is not to be construed as limiting the element to the singular.

The invention claimed is:

1. A component for a motor vehicle lighting device, comprising:
a joining portion with an adhesive channel for forming an adhesive connection with a joining crosspiece of a second component, wherein the joining portion has a solvent channel connected to the adhesive channel, wherein the solvent channel includes a width that is less than a width of the adhesive channel, and wherein the solvent channel extends in a downward direction from the adhesive channel, such that solvent channel is in fluid communication with a lowermost portion of the adhesive channel and is otherwise closed off from an exterior of the joining portion until an access port is formed through the joining portion for the delivery of a solvent therethrough.

2. The component of claim 1, wherein the solvent channel extends substantially along the entire length of the adhesive channel.

3. The component of claim 1, wherein the solvent channel is connected to the adhesive channel substantially along the entire length of the adhesive channel.

4. The component of claim 1, wherein the solvent channel width is sufficiently narrow such that the solvent channel cannot be penetrated by an adhesive in the adhesive channel.

5. The component of claim 1 comprising a housing or a cover lens of a motor vehicle lighting device.

6. A connection arrangement comprising:

the component of claim 1, the component comprising a first component; and a second component, wherein an adhesive connection is formed between the joining portion of the first component and a joining crosspiece of the second component, wherein the joining crosspiece of the second component projects into the adhesive channel filled with an adhesive, and wherein the solvent channel is free of an adhesive.

7. The component of claim 1, wherein the width of the solvent channel is 0.5 mm to 2 mm.

8. The component of claim 1, wherein the solvent channel defines a depth of 3 mm to 50 mm.

9. A component for a motor vehicle lighting device, comprising:

a joining portion with an adhesive channel for forming an adhesive connection with a joining crosspiece of a second component, wherein the joining portion has a solvent channel connected to the adhesive channel, and wherein the joining portion has at least one access portion which is provided for opening an external access port to the solvent channel via a bore, wherein the access portion has a rib structure which locally stiffens the joining portion proximal to the solvent channel.

10. A method for releasing a connection arrangement of claim 6, the method comprising:

providing a first component, the first component including a joining portion with an adhesive channel for forming an adhesive connection with a joining crosspiece of a second component, wherein the joining portion has a solvent channel connected to the adhesive channel;

providing the second component, wherein an adhesive connection is formed between the joining portion of the first component and the joining crosspiece of the second component, wherein the joining crosspiece of the second component projects into the adhesive channel filled with an adhesive, and wherein the solvent channel is free of an adhesive;

opening an external access port to the solvent channel by drilling into the first component;

injecting a solvent into the solvent channel via the at least one external access port;

waiting for the adhesive to soften by reacting with the solvent; and releasing the first component and the second component from one another.

* * * * *